(12) United States Patent
Reeves et al.

(10) Patent No.: US 11,980,972 B2
(45) Date of Patent: May 14, 2024

(54) INNER BARREL OF AN ENGINE INLET WITH LASER-MACHINED ACOUSTIC PERFORATIONS

(71) Applicant: THE BOEING COMPANY, Chicago, IL (US)

(72) Inventors: Jake Adam Reeves, Newcastle, WA (US); Mark Alan Negley, Tukwila, WA (US); Eric Herrera, Mukilteo, WA (US); John Scott Bauman, Seattle, WA (US); Brandon L. Bertolucci, Seattle, WA (US); Perry T. Horst, Tacoma, WA (US)

( * ) Notice: Subject to any disclaimer, the term of this patent is extended or adjusted under 35 U.S.C. 154(b) by 374 days.

(21) Appl. No.: 17/343,383

(22) Filed: Jun. 9, 2021

(65) Prior Publication Data
US 2021/0291302 A1 Sep. 23, 2021

Related U.S. Application Data

(62) Division of application No. 15/964,331, filed on Apr. 27, 2018, now Pat. No. 11,052,490.

(51) Int. Cl.
| B23K 26/382 | (2014.01) |
| B23K 101/00 | (2006.01) |
| F02C 7/045 | (2006.01) |

(52) U.S. Cl.
CPC ............ B23K 26/389 (2015.10); F02C 7/045 (2013.01); B23K 2101/001 (2018.08);
(Continued)

(58) Field of Classification Search
CPC ........................... B23K 26/386; B23K 26/389; B23K 26/0624; B23K 2103/172;
(Continued)

(56) References Cited

U.S. PATENT DOCUMENTS

2002/0036115 A1    3/2002  Wilson
2006/0169677 A1*   8/2006  Deshi .................. B23K 26/382
                                                           219/121.7
(Continued)

FOREIGN PATENT DOCUMENTS

CN    104607808 A    5/2015
CN    105312782 A    2/2016
(Continued)

OTHER PUBLICATIONS

Notice of Reasons for Rejection for JP 2019-079089, dated Jun. 6, 2023 (and English translation).
(Continued)

Primary Examiner — Nathaniel E Wiehe
Assistant Examiner — Dilnessa B Belay
(74) Attorney, Agent, or Firm — Joseph M. Butscher; The Small Patent Law Group LLC

(57) ABSTRACT

A forming system includes a femtosecond laser and a control unit that includes one or more processors operatively connected to the femtosecond laser. The femtosecond laser is configured to emit laser pulses onto an inner surface of a face sheet of an acoustic inner barrel. The acoustic inner barrel includes an acoustic core comprising an array of hexagonal cells attached to an outer surface of the face sheet that is opposite the inner surface. The control unit is configured to control the femtosecond laser to laser drill a plurality of perforations in the face sheet via emitting laser pulses at pulse durations between about 100 femtoseconds and about 10,000 femtoseconds and at frequencies over 100,000 Hz.

20 Claims, 5 Drawing Sheets

(52) U.S. Cl.
  CPC .... *F05D 2220/323* (2013.01); *F05D 2230/13* (2013.01); *F05D 2250/18* (2013.01); *F05D 2260/96* (2013.01)

(58) Field of Classification Search
  CPC ........... F05D 2220/323; F05D 2230/13; F05D 2250/18; F05D 2260/96
  See application file for complete search history.

(56) References Cited

U.S. PATENT DOCUMENTS

| | | |
|---|---|---|
| 2010/0320174 A1 | 12/2010 | Hybinette et al. |
| 2011/0244150 A1* | 10/2011 | Thrash ................. F01D 21/045 29/446 |
| 2013/0075193 A1* | 3/2013 | Vavalle ................. B29C 70/443 156/253 |
| 2013/0224433 A1 | 8/2013 | Matsumoto et al. |
| 2015/0063932 A1 | 3/2015 | Zubin et al. |

FOREIGN PATENT DOCUMENTS

| | | |
|---|---|---|
| JP | 2004-216430 | 8/2004 |
| JP | 2008246492 A | 10/2008 |
| JP | 2015061736 | 4/2015 |

OTHER PUBLICATIONS

Office Action received for related Canadian Patent Application No. 3,030,913 dated Feb. 21, 2022 (10 pages).

English translation of the First Office Action received for related Chinese Patent Application No. 2019102015682 dated Apr. 6, 2022 (16 pages).

First Office Action received for related Chinese Patent Application No. 2019102015682 dated Apr. 6, 2022 (8 pages).

Extended European Search Report received for related European Patent Application No. 21211386.4 dated Mar. 17, 2022.

* cited by examiner

INNER BARREL OF AN ENGINE INLET WITH LASER-MACHINED ACOUSTIC PERFORATIONS

CROSS-REFERENCE TO RELATED APPLICATIONS

This application is a divisional of U.S. application Ser. No. 15/964,331, filed 27 Apr. 2018, now U.S. Pat. No. 11,052,490, which is hereby incorporated by reference in its entirety.

FIELD OF THE DISCLOSURE

Embodiments of the present disclosure generally relate to the production of a variety of different structures that require acoustic treatment.

BACKGROUND

Commercial airliners are required to meet certain noise standards during takeoff and landing. A large portion of the noise produced by a commercial airliner during takeoff and landing is generated by gas turbine engines commonly used on airliners. Known methods for reducing the noise level of a gas turbine engine include acoustically treating the inlet section of the engine nacelle. In this regard, an inner barrel of a gas turbine engine inlet section may be provided with a plurality of relatively small perforations formed in the walls of the inner barrel. The perforations absorb some of the noise that is generated by fan blades rotating at high speed at the engine inlet section, and thereby reduce the overall noise output of the gas turbine engine.

Conventional methods for forming perforations in acoustic structures, such as the inner barrel, are complex and/or inefficient. For example, some known methods utilize routers and/or drills to mechanically drill the perforations, which can be time consuming, unreliable, and imprecise.

Another method for forming perforations in acoustic structures includes non-contact drilling using lasers. The conventional laser drilling methods may be relatively energy intensive and melt and/or burn the material of the inner barrel surrounding the perforations due to high thermal conduction from the laser beams.

SUMMARY OF THE DISCLOSURE

A need exists for a system and method for forming perforations in an acoustic structure that accurately produces uniform perforations having a designated size and shape and pattern in a timely, energy efficient, and cost-effective manner. The above-noted needs associated with forming perforations in an acoustic structure such as an inner barrel of an engine inlet assembly are specifically addressed and alleviated by the present disclosure, which provides a method for forming an inlet assembly of an engine. The method includes attaching a face sheet to an acoustic core, and controlling a femtosecond laser to laser drill a plurality of perforations in the face sheet without burning portions of the face sheet or the acoustic core surrounding the perforations.

Certain embodiments of the present disclosure provide a forming system that includes a femtosecond laser and a control unit that includes one or more processors operatively connected to the femtosecond laser. The femtosecond laser is configured to emit laser pulses onto an inner surface of a face sheet of an acoustic inner barrel. The acoustic inner barrel includes an acoustic core comprising an array of hexagonal cells attached to an outer surface of the face sheet that is opposite the inner surface. The control unit is configured to control the femtosecond laser to laser drill a plurality of perforations in the face sheet via emitting laser pulses at pulse durations between about 100 femtoseconds and about 10,000 femtoseconds and at frequencies over 100,000 Hz such that the perforations are formed without burning portions of the face sheet or the acoustic core surrounding the perforations.

Certain embodiments of the present disclosure provide a method (e.g., for forming an engine inlet assembly). The method includes attaching a face sheet to an acoustic core, and controlling a femtosecond laser to laser drill a plurality of perforations in the face sheet without burning portions of the face sheet or the acoustic core surrounding the perforations.

Certain embodiments of the present disclosure also provide a method (e.g., for forming an engine inlet assembly). The method includes forming a face sheet in-situ on an interior side of an acoustic core that comprises an array of hexagonal cells via auto-fiber placement of multiple layers of fiber-reinforced material on the acoustic core. The method also includes controlling a femtosecond laser to laser drill a plurality of perforations in the face sheet that is formed via emitting laser pulses at pulse durations between about 100 femtoseconds and about 10,000 femtoseconds and at frequencies over 100,000 Hz such that the perforations are formed without burning portions of the face sheet or the acoustic core surrounding the perforations. The controlling includes controlling the femtosecond laser to emit one or more laser pulses at each of multiple perforation locations along the face sheet one at a time in a sequence, and repeating the sequence multiple times to gradually form the perforations at the perforation locations.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
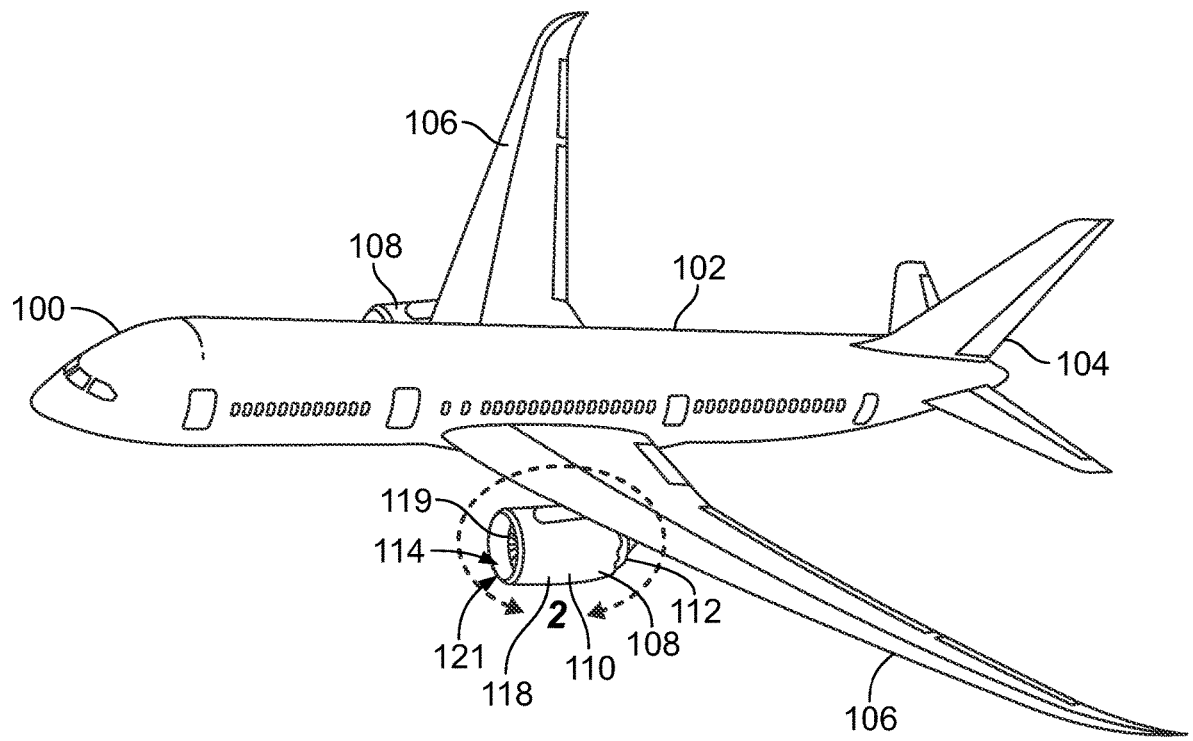
FIG. 1 is a perspective illustration of an aircraft that includes a gas turbine engine.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide systems and methods for forming noise abatement structures having perforations formed into an inner face sheet of an acoustically treated structure, such as an acoustic inlet barrel of an aircraft engine. Certain embodiments of the present disclosure provide systems and methods for creating a plurality of perforations on a structure having a complex curvature, such as an acoustically-treated inner barrel of an inlet of an aircraft engine.

A face sheet may include a single ply of material, or multiple plies of material. For example, the face sheet may include multiple sheets, layers, or plies of material that are laminated together.

Certain embodiments of the present disclosure provide systems and methods for forming a plurality of perforations in composite material, such as on an acoustic inner barrel of an engine inlet assembly. The perforations are formed by laser drilling using an ultrafast femtosecond laser that emits laser pulses at very short pulse durations and high frequencies (e.g., relative to conventional lasers). The short pulse durations provide sufficient delay between pulses for heat to dissipate without being thermally conducted into the surrounding material of the acoustic inner barrel. The lack of thermal conduction prevents melting or burning of the material surrounding the perforations, enabling uniform, precise perforations without residual remnants. As a result, the acoustic inner barrel according to the systems and methods described herein may have an increased overall effectiveness in absorbing and/or attenuating noise (relative to conventional methods of forming perforations). The femtosecond laser may also provide a more timely and cost-effective process over mechanical drilling due to the avoidance of mechanical contact and the avoidance of replacing broken drill bits. The femtosecond laser may also be more timely and energy efficient than known laser drilling methods for forming perforations due to increased speed and a reduced amount of wasted laser energy. The formation systems and methods disclosed herein may also be more time, energy, and cost efficient than some known methods by providing a more streamlined formation process that eliminates some conventional steps.

Referring now to the drawings, which illustrate various embodiments of the present disclosure, FIG. 1 is a perspective illustration of an aircraft 100. The aircraft 100 may include a fuselage 102 extending from a nose to an empennage 104. The empennage 104 may include one or more tail surfaces for directional control of the aircraft 100. The aircraft 100 may include a pair of wings 106 extending outwardly from the fuselage 102.

The aircraft 100 may include one or more propulsion systems which are optionally supported by the wings 106. Each one of the propulsion systems may include or represent a gas turbine engine 108 having a core engine (not shown) surrounded by a nacelle 110. The nacelle 110 may include an inlet cowl 114 and a fan cowl 118 surrounding one or more fans 119 mounted on a forward end 121 of the core engine. The nacelle 110 may have an exhaust nozzle 112 (e.g., a primary exhaust nozzle and a fan nozzle) at an aft end (not shown) of the gas turbine engine 108.

Figure 2:
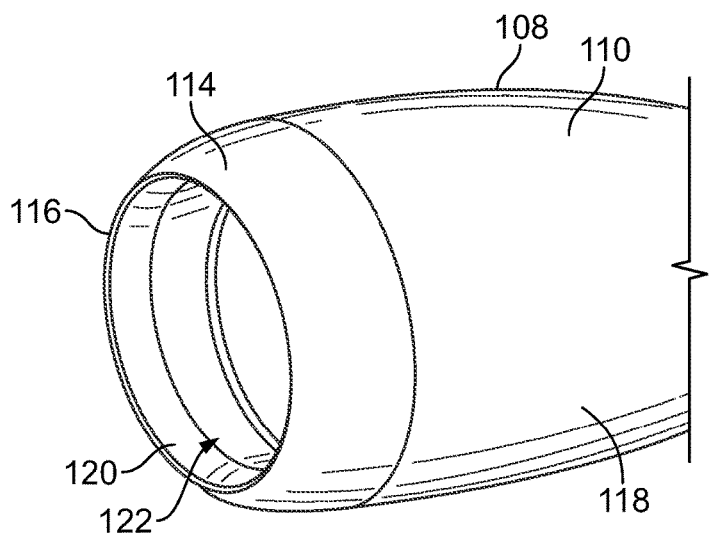
FIG. 2 illustrates an embodiment of a nacelle of the gas turbine engine shown in FIG. 1.

FIG. 2 illustrates an embodiment of the nacelle 110 of the gas turbine engine 108 shown in FIG. 1. The inlet cowl 114 includes a leading edge 116. An acoustic inner barrel 120 is mounted to the inlet cowl 114 and located aft of the leading edge 116. The acoustic inner barrel 120 is located forward of the fan cowl 118. The acoustic inner barrel 120 may provide a boundary surface or wall for directing airflow (not shown) entering the inlet cowl 114 and passing through the gas turbine engine 108. The acoustic inner barrel 120 may be located in relatively close proximity to one or more fans (e.g., the fan 119 shown in FIG. 1) of the engine 108. The acoustic inner barrel 120 serves as an acoustic structure having a plurality of perforations in an inner face sheet of the inner barrel 120 for absorbing noise generated by the rotating fans and/or noise generated by the airflow entering the inlet cowl 114 and passing through the gas turbine engine 108. As used herein, the acoustic inner barrel 120 mounted to the inlet cowl 114 defines or represents an engine inlet assembly 122.

Figure 3:
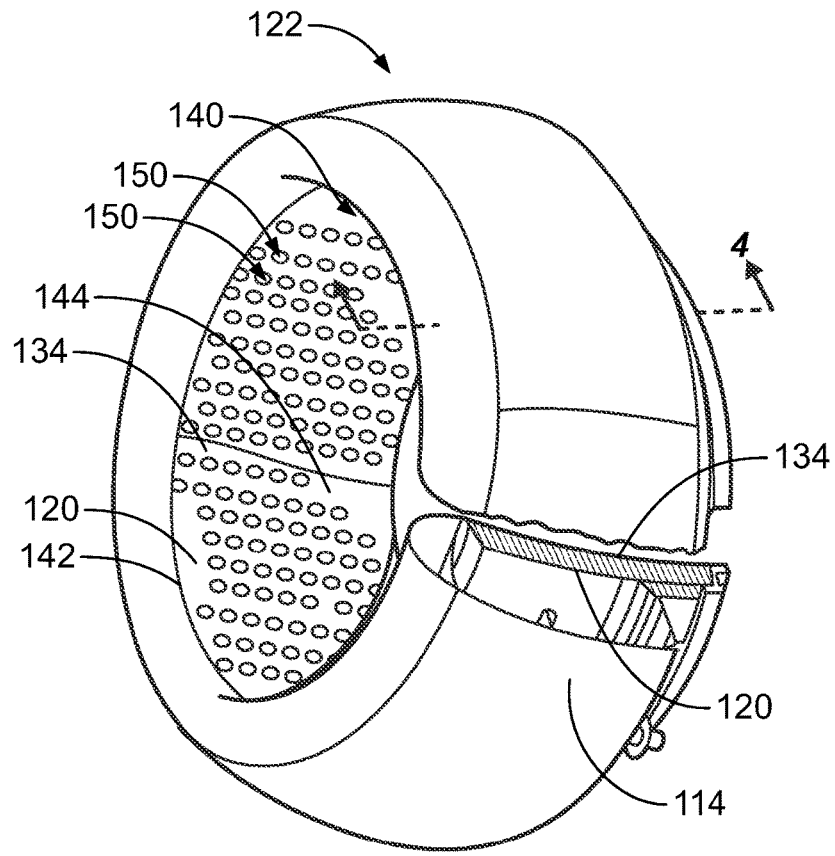
FIG. 3 is a perspective illustration of an engine inlet assembly of the gas turbine engine of FIG. 2.

FIG. 3 is a perspective illustration of an embodiment of the engine inlet assembly 122. The engine inlet assembly 122 has an annular barrel shape that defines a cavity 140. The term "annular barrel shape" means that the engine inlet assembly 122 defines a closed, ring-like shape oriented radially about a central point, and the engine inlet assembly 122 is elongated along a centerline axis 209 (shown in FIG. 6) that extends through the central point. For example, the engine inlet assembly 122 may have a generally cylindrical shape with a diameter that is uniform or varying along the length thereof. The cavity 140 is open at first and second ends of the engine inlet assembly 122 to channel air flow through the engine inlet assembly 122 into the gas turbine engine 108 (shown in FIGS. 1 and 2). The acoustic inner barrel 120 is mounted to the inlet cowl 114 along an inner side 142 that faces and partially defines the cavity 140. The acoustic inner barrel 120 defines an interior surface 144 of the engine inlet assembly 122 along a perimeter of the cavity 140. Outer portions of the inlet cowl 114 surround the acoustic inner barrel 120. The acoustic inner barrel 120 may be exposed only to the air flowing through the cavity 140, while the inlet cowl 114 is exposed to air flowing into the cavity 140 and around the outside of the engine inlet assembly 122. The cavity 140 may have a diameter of up to 5-8 feet (1.5 meters (m) to 2.5 m), although the engine inlet assembly 122 may be provided in other sizes, shapes, and/or configurations in other embodiments.

The acoustic inner barrel 120 includes a plurality of perforations 150 that are exposed to the air within the cavity 140. The acoustic inner barrel 120 is a composite structure that includes a face sheet 134. The perforations 150 are formed in the face sheet 134. The perforations 150 are small holes that extend at least partially through a thickness of the face sheet 134. The perforations 150 may have various sizes, shapes, orientations, and/or arrangements in different embodiments. For example, the perforations 150 in one or more embodiments may be micro-perforations having small diameters between about 50 micrometers (μm) and about 500 μm. As used herein, a given numerical value preceded by the term "about" is inclusive of numerical values within a designated range of the given numerical value, such as 1%, 5%, or 10% of the given numerical value. The perforations 150 in FIG. 3 are enlarged in order to illustrate the perforations 150, because the perforations 150 in at least one embodiment may be too small for viewing with the naked eye.

The total area of the perforations 150 in the face sheet 134 may be expressed as a percent-open-area, which represents the combined area of the perforations 150 as a percentage of the area of the face sheet 134. The percent-open-area may be a characteristic for measuring the overall effectiveness or acoustic-attenuating capability of the acoustic inner barrel 120. During the design and/or development of the aircraft 100, a predetermined percent-open-area may be selected for the acoustic inner barrel 120 to meet acoustic performance requirements of the engine inlet assembly 122.

Figure 4:
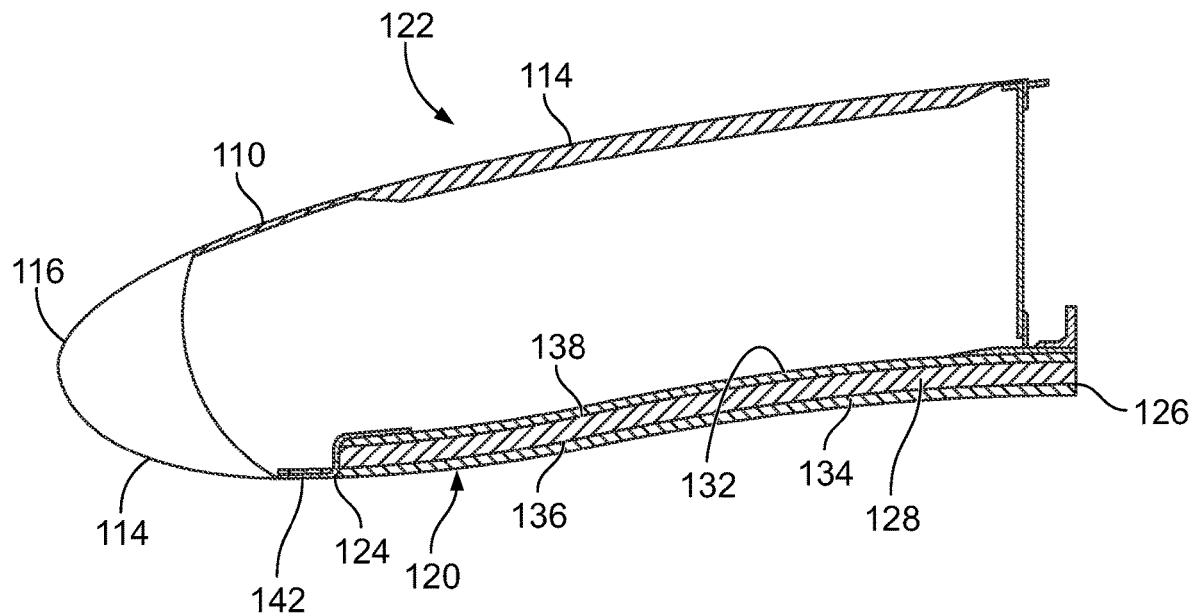
FIG. 4 is a cross-sectional illustration of the engine inlet assembly shown in FIG. 3.

FIG. 4 is a cross-sectional illustration of the engine inlet assembly 122. The acoustic inner barrel 120 may be a composite structure that includes the face sheet 134 and an acoustic core 128. The acoustic inner barrel 120 optionally also includes a back sheet 132 along an opposite side of the acoustic core 128 from the face sheet 134 such that the acoustic core 128 is stacked between the face sheet 134 and the back sheet 132. For example, the face sheet 134 is disposed along an interior side 136 of the acoustic core 128, and the back sheet 132 is disposed along an exterior side 138 of the acoustic core 128 that is opposite the interior side 136. In at least one embodiment, the acoustic inner barrel 120 lacks a septum layer, such as a fabric liner, embedded within the acoustic core 128.

The acoustic inner barrel 120 is mounted along the inner side 142 of the inlet cowl 114. Optionally, a forward edge 124 of the acoustic inner barrel 120 may be coupled to and/or may interface with the inlet cowl 114 at or proximate to the leading edge 116 of the inlet cowl 114. An aft edge 126 of the acoustic inner barrel 120 may be coupled to and/or may interface with the inlet cowl 114 and/or the fan cowl 118 (FIG. 2). The face sheet 134, the acoustic core 128, and the back sheet 132 may have complexly-curved cross sectional shapes to promote efficient airflow through the nacelle 110.

Figure 5:
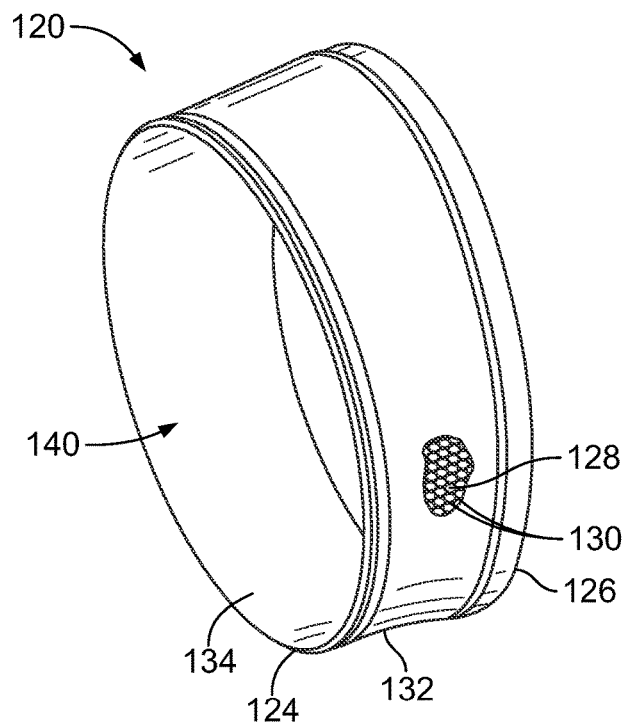
FIG. 5 is a perspective illustration of an embodiment of an acoustic inner barrel of the engine inlet assembly.

FIG. 5 is a perspective illustration of an embodiment of the acoustic inner barrel 120. For example, FIG. 5 shows the acoustic inner barrel 120 without the inlet cowl 114. The acoustic inner barrel 120 has an annular barrel shape that extends axially from the forward edge 124 to the aft edge 126. The face sheet 134 faces radially inward to define the cavity 140, and the back sheet 132 faces radially outward. The perforations 150 (shown in FIG. 3) of the face sheet 134 are not shown in FIG. 5. The face sheet 134 may be formed of a composite material including a fiber-reinforced polymeric matrix material such as graphite-epoxy (e.g., carbon fiber-epoxy), fiberglass-epoxy, or another composite material. The back sheet 132 may also be formed of a composite material, or alternatively may be formed of a metallic material, such as titanium, steel, aluminum, or the like. The acoustic core 128 may include or represent a honeycomb structure having a plurality of cells 130 oriented generally transverse to the face sheet 134 and back sheet 132. The cells 130 may have hexagonal shapes. The acoustic core 128 may be formed of metallic material (e.g., aluminum, titanium, etc.) and/or non-metallic material (e.g., aramid, fiberglass, etc.). As mentioned above, the acoustic core 128 may lack a septum layer, such as a fabric liner, embedded within the honeycomb cells 130.

The acoustic inner barrel 120 may have a unitary structure in a closed, generally cylindrical shape, accomplished via assembling and curing in one or more stages. For example, the face sheet 134 and the back sheet 132 may be separately formed by laying up dry fiber fabric (not shown) or resin-impregnated ply material (for example, pre-preg) on separate layup mandrels (not shown) and separately cured. The acoustic core 128 may be separately formed via additive manufacturing or the like. After curing the face sheet 134 and the back sheet 132, the sheets 134, 132 are bonded to respective opposite sides of the acoustic core 128. Alternatively, the acoustic inner barrel 120 may be fabricated in a single-stage cure process in which the face sheet 134 may be laid up on a layup mandrel (not shown), after which the acoustic core 128 may be laid up over the face sheet 134, followed by laying up the back sheet 132 over the acoustic core 128. The layup assembly may be cured in a single stage, after which a forming system 200 (shown in FIG. 6) may be implemented for forming perforations in the inner face sheet 134.

In one or more embodiments, the acoustic core 128 is formed via additive manufacturing, and the face sheet 134 is attached to the acoustic core 128 by forming the face sheet 134 in-situ on the acoustic core 128. For example, the face sheet 134 may be formed via an automated fiber placement (AFP) process in which multiple layers of fiber-reinforced material are applied on the acoustic core 128. The layers may be tows or bundles of carbon fibers impregnated with an epoxy resin. The tows may be applied automatically via a robot. The robot may apply the tows of different layers in different orientations. After applying the layers of fiber-reinforced material to define the face sheet 134, the combination face sheet 134 and acoustic core 128 may be cured. The face sheet 134 may be formed on the acoustic core 128 while the acoustic core 128 is in an annular barrel shape, as shown in FIG. 5. In an alternative embodiment, the acoustic core 128 may be in a flat or planar orientation during the AFP process to form the face sheet 134, and after the AFP process the combined structure is shaped by a mandrel or the like into the annular barrel shape. The back sheet 132 optionally may also be formed in-situ on the opposite side of the acoustic core 128 as the face sheet 134, such as by the AFP process or the like.

Figure 6:
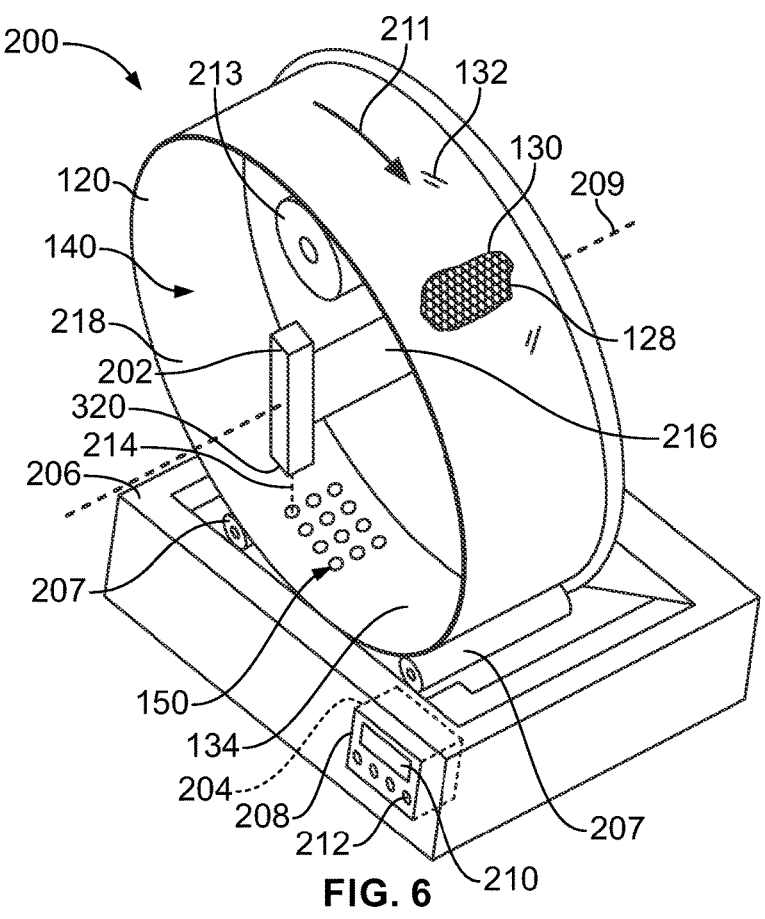
FIG. 6 illustrates an embodiment of a forming system for forming perforations in the acoustic inner barrel of the gas turbine engine.

FIG. 6 illustrates an embodiment of a forming system 200 for forming perforations in the acoustic inner barrel 120 of the engine 108 (shown in FIG. 2) or another acoustic panel. The forming system 200 includes an ultrafast femtosecond laser 202 and a control unit 204 that is operatively connected to the femtosecond laser 202 for controlling the laser 202. The forming system 200 is operated to form a plurality of perforations 150 in the inner face sheet 134 of the acoustic inner barrel 120. The perforations 150 may be formed in a designated size, shape, quantity, density, and/or pattern by the forming system 200. The designated size, shape, quantity, density, and/or pattern may be based on a predetermined percent-open-area for the acoustic inner barrel 120 to meet acoustic performance requirements of the inlet cowl 114 (shown in FIGS. 2 and 3).

The forming system 200 optionally includes a positioning platform 206 on which the acoustic inner barrel 120 is mounted. In the illustrated embodiment, the positioning platform 206 has multiple actuators 207 that engage and move the acoustic inner barrel 120. The actuators 207 are rollers in the illustrated embodiment. The acoustic inner barrel 120 is removably loaded onto the positioning platform 206 in a vertical orientation such that a centerline axis 209 of the acoustic inner barrel 120 is parallel to a horizontal plane of the positioning platform 206. The actuators 207 engage the back sheet 132 of the acoustic inner barrel 120.

Controlled rotation of the actuators 207 rotates the acoustic inner barrel 120 in a rotational direction 211 about the centerline axis 209. Optionally, at least one stabilizing roller 213 may engage the acoustic inner barrel 120 above the centerline axis 209 to secure the acoustic inner barrel 120 on the positioning platform 206, preventing the acoustic inner barrel 120 from tipping over.

The femtosecond laser 202 extends into the cavity 140 defined by the acoustic inner barrel 120. Optionally, the femtosecond laser 202 is positioned in-line with the centerline axis 209 of the acoustic inner barrel 120. The femtosecond laser 202 is held by an effector arm 216. The femtosecond laser 202 emits a beam of laser pulses 214 onto an inner surface 218 of the face sheet 134, which defines a perimeter of the cavity 140. In the illustrated embodiment, the femtosecond laser 202 is held stationary by the effector arm 216, and the positioning platform 206 gradually rotates the acoustic inner barrel 120 relative to the femtosecond laser 202.

The positioning platform 206 may also hold the control unit 204. In the illustrated embodiment, the control unit 204 is embedded or mounted within the positioning platform 206. The control unit 204 may be operatively connected to the femtosecond laser 202 through a wired connection or a wireless connection. For example, electrical wires (not shown) may extend through the positioning platform 206 from the control unit 204 to the femtosecond laser 202. The control unit 204 includes one or more processors that are configured to operate the femtosecond laser 202 based on programmed instructions. The control unit 204 optionally includes additional features or components, such as a storage device (e.g., memory), an input/output (I/O) device 208, and/or a wireless communication device. The user I/O device 208 is illustrated in FIG. 6, and includes a user interface with a display 210 and multiple buttons or knobs 212. It is recognized that the forming system 200 shown in FIG. 6 is a non-limiting example embodiment. The forming system 200 in an alternative embodiment may lack the positioning platform 206 and/or lack the I/O device 208 of the control unit 204. In an alternative embodiment, the control unit 204 may be mounted within a structure of the femtosecond laser 202 instead of separated from the femtosecond laser 202 via the positioning platform 206.

The femtosecond laser 202 is configured to generate and emit laser pulses at very high speeds and very short pulse durations relative to conventional lasers. For example, the femtosecond laser 202 is called a "femtosecond" laser because the pulse durations (e.g., pulse widths) are on the order of femtoseconds (fs), which is $10^{-15}$ seconds. The femtosecond laser 202 according to at least one embodiment may emit laser pulses at pulse durations between about 100 fs and about 10,000 fs (or 10 picoseconds), although the pulse durations may be even shorter than 100 fs. The very short pulse durations allow the femtosecond laser 202 to have a relatively high peak power (e.g., peak power is pulse energy divided by pulse duration) without necessarily increasing the pulse energy. The very short pulse durations allow time between successive pulses for heat to dissipate from the working surface, which is the face sheet 134 in the illustrated embodiment. The heat dissipation prevents thermal conduction that could damage the face sheet 134 and/or disrupt the air flow along the face sheet 134, reducing the effectiveness of the acoustic inner barrel 120 at noise attenuation. As a result, the perforations 150 in the face sheet 134 can be formed accurately and precisely, increasing the noise attenuation effectiveness of the acoustic inner barrel 120. Conventional lasers are not able to produce laser pulses with such short pulse durations, and, because there is less time between pulses, heat accumulates along the working surfaces which may damage the surfaces.

The speed of the femtosecond laser 202 may be characterized by laser pulse frequencies of at least 10,000 hertz (Hz). In at least one embodiment, the frequency of the femtosecond laser 202 is over 100,000 Hz, such as between about 100,000 Hz and about 500,000 Hz. Although the pulse frequency is relatively high, the very short pulse durations allow enough time lapse between successive pulses for heat dissipation. For example, the laser pulses 214 may avoid burning the epoxy of the face sheet 134 in the area immediately surrounding the perforation 150 being formed.

The femtosecond laser 202 is configured to form perforations 150 of various sizes, shapes, and orientations. For example, the femtosecond laser 202 may percussive drill (via the laser pulses) perforation diameters that are between about 50 μm and about 500 μm. The perforations 150 produced by the femtosecond laser 202 may be smaller than the diameters of perforations in known acoustic inner barrels that are formed via mechanical drilling and/or conventional lasers. The femtosecond laser 202 may also be configured to trepan drill larger diameter perforations by emitting the laser pulses 214 in a ring around the perimeter of the perforations 150.

The femtosecond laser 202 is able to aim the laser pulses 214 at different perforation locations along the face sheet 134 due to the rotation of the acoustic inner barrel 120. In at least one embodiment, the femtosecond laser 202 has a scanning head 320 that is configured to aim the laser beam 302 at multiple locations in quick succession. The scanning head 320 may be a galvo scan head. The scanning head 320 may be controllable (e.g., by the control unit 204) to direct the laser pulses 214 along at least one axis. In the illustrated embodiment, the scanning head 320 is positioned vertically downwards and directs the laser pulses 214 onto the face sheet 134 below the femtosecond laser 202.

The control unit 204 controls the operation of the femtosecond laser 202. For example, the control unit 204 may control the positioning and orientation of the femtosecond laser 202, as well as the generation and emission of laser pulses. The control unit 204 may transmit electrical control signals to the femtosecond laser 202 to control the operation thereof. The control unit 204 may control the femtosecond laser 202 to laser drill the perforations 150 in the face sheet 134 in a designated pattern with a predetermined percent-open-area. In addition to guiding the location of the laser pulses 214 on the face sheet 134, the control unit 204 may control the characteristics of the laser pulses. The characteristics of the pulses may include the timing at which pulses are emitted, the pulse frequency, the pulse durations (e.g., widths), the pulse intensity, pulse thickness (e.g., diameter), pulse energy, and/or the like. As described above, the femtosecond laser 202 is configured to emit pulses with ultrashort pulse durations on the order of femtoseconds, which provides large time intervals between successive pulses for heat dissipation. The perforations 150 are formed without burning portions of the face sheet 134 (or the acoustic core 128) surrounding the perforations 150.

As shown in FIG. 6, the acoustic inner barrel 120 may be assembled with the face sheet 134 attached to the cells 130 of the acoustic core 128 prior to the femtosecond laser 202 laser drilling the perforations 150. Furthermore, the acoustic inner barrel 120 may already be formed to have the annular barrel shape when the femtosecond laser 202 performs the laser drilling. For example, the acoustic inner barrel 120 may not undergo additional bending or forming after the perforations 150 are created, which prevents stretching the perforations 150 from the designated size and shape.

Although the forming system 200 in FIG. 6 is applied to form perforations 150 in the acoustic inner barrel 120 of the engine inlet assembly 122 (shown in FIGS. 2 and 3) of the gas turbine engine 108 (FIG. 2), the forming system 200 may be implemented for forming perforations in any type of barrel structure for any application, without limitation. For example, the forming system 200 may be implemented for forming perforations in a barrel section of any one of a variety of different types of commercial, civilian, and military aircraft. Furthermore, the forming system 200 may be implemented for forming perforations in the barrel section of a gas turbine engine of rotorcraft, hovercraft, or in any other vehicular or non-vehicular application in which a predetermined quantity of acoustic perforations are desired for acoustic attenuating purposes.

Figure 7:
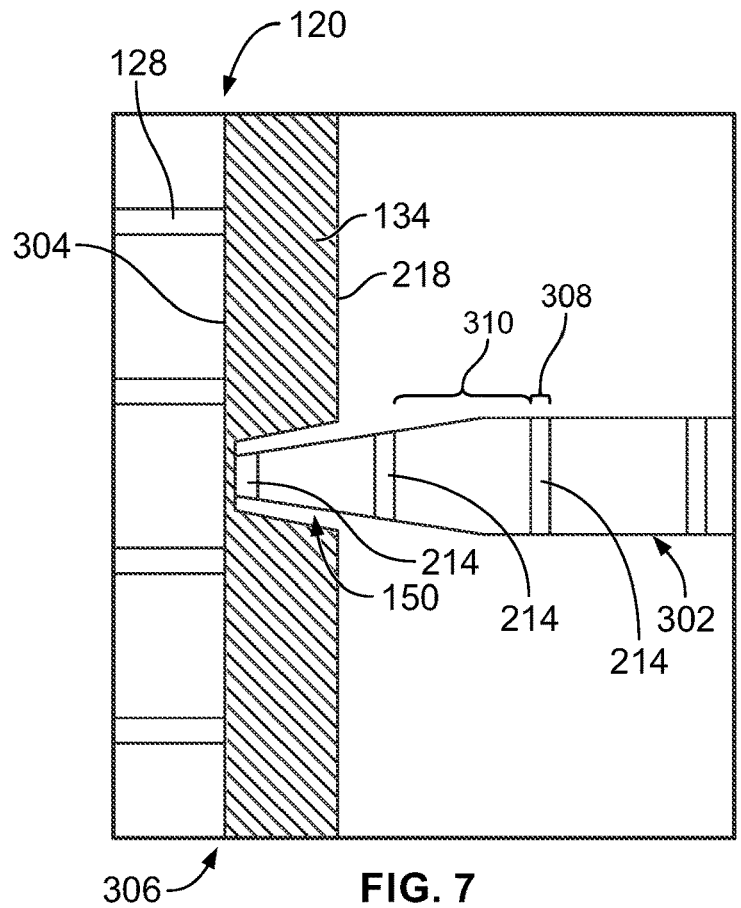
FIG. 7 is a schematic cross-sectional view of a portion of the acoustic inner barrel showing a laser beam impinging upon the acoustic inner barrel to form a perforation.

FIG. 7 is a schematic cross-sectional view of a portion of the acoustic inner barrel 120 showing a laser beam 302 of multiple laser pulses 214 impinging upon the acoustic inner barrel 120 to form one of the perforations 150 according to an embodiment. The face sheet 134 has a thickness from the inner surface 218 to an opposite, outer surface 304. The outer surface 304 abut the acoustic core 128 and defines an interface 306 between the acoustic core 128 and the face sheet 134.

As shown in FIG. 7, the femtosecond laser 202 (FIG. 6) emits the laser beam 302 with multiple laser pulses 214 that have short (e.g., ultrashort) pulse durations 308 on the order of femtoseconds. The laser pulses 214 are separated by time intervals 310. In an embodiment, the pulse durations 308 are significantly shorter than the time intervals 310 because the frequency of pulses 214 is orders of magnitude greater than the pulse durations 308. For example, the frequency of pulses 214 may be between about 100,000 Hz and about 500,000 Hz, and the pulse durations 308 may be between about 100 fs and about 10,000 fs. It is recognized that the schematic illustration in FIG. 7 is not drawn to scale.

The laser pulses 214 impinge upon the inner surface 218 of the face sheet 134 and gradually ablate material from the face sheet 134 to define the perforation 150. The relatively long time intervals 310, relative to the pulse durations 308, allow for heat dissipation between successive laser pulses 214. As a result, thermal conduction may into the surrounding areas of the face sheet 134 and acoustic core 128 may not occur or may be negligible such that the laser pulses 214 do not damage the face sheet 134 or the acoustic core 128 around the perforation 150. The femtosecond laser 202 (FIG. 6) may be sufficiently precise and accurate to enable laser drilling through the thickness of the face sheet 134 to the interface 306 without penetrating or damaging the acoustic core 128.

Figure 8:
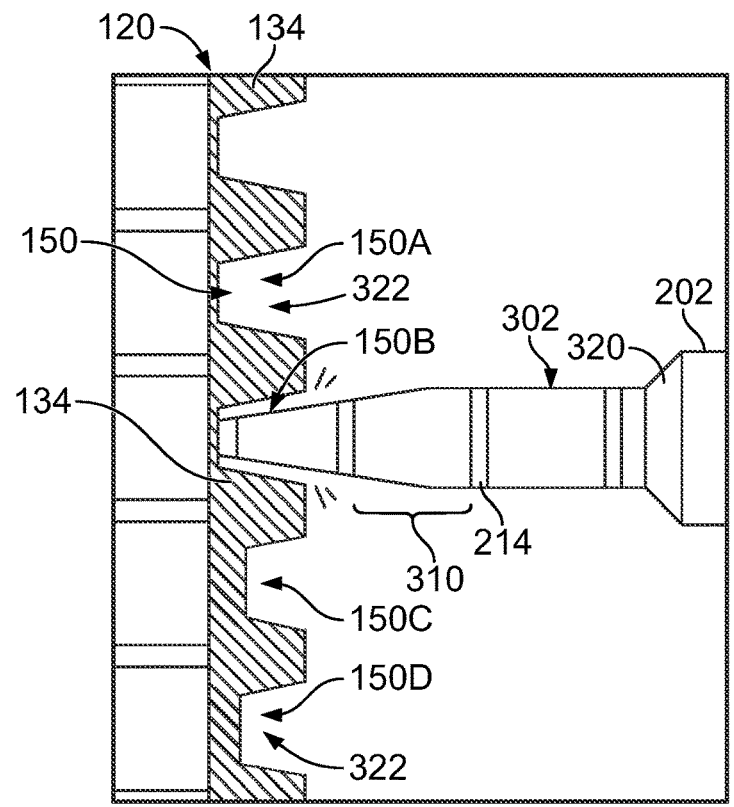
FIG. 8 is another schematic cross-sectional view of a portion of the acoustic inner barrel showing a laser beam impinging upon the acoustic inner barrel according to an embodiment.

FIG. 8 is another schematic cross-sectional view of a portion of the acoustic inner barrel 120 showing a laser beam 302 of multiple laser pulses 214 impinging upon the face sheet 134 of the acoustic inner barrel 120 to form one of the perforations 150 according to an embodiment. In at least one embodiment, the scanning head 320 of the femtosecond laser 202 is configured to aim the laser beam 302 at multiple different perforation locations 322 in quick succession. Although not shown, the scanning head 320 may include one or more lenses, beam splitters, reflectors, or the like, for distributing the laser pulses 214 among the different perforations locations 322 in a repeating sequence. For example, FIG. 8 shows four perforations 150 that are incomplete. First perforations 150A and second perforations 150B of the four perforations 150 have greater depths than third and fourth perforations 150C, 150D. The scanning head 320 emits one or more laser pulses 214 at the second perforation 150B in the illustrated embodiment.

The scanning head 320 of the femtosecond laser 202 may be controlled (e.g., by the control unit 204 shown in FIG. 6) to emit one or more of the laser pulses 214 at each of multiple perforation locations 322 one at a time in a sequence, and then repeat the sequence multiple times to define an array of the perforations 150. For example, the four perforations 150A-D may represent an array, and the sequence may be to emit one or more pulses 214 at the perforation locations 322 associated with the first perforation 150A, then the second perforation 150B, then the third perforation 150C, and finally the fourth perforation 150D in the array. During each pass, the laser pulses 214 ablate or otherwise remove more material from each of the perforations 150. After completing a pass by emitting one or more pulses 214 at the perforation location 322 of the fourth perforation 150D, the scanning head 320 is controlled to repeat the sequence by directing one or more pulses 214 towards the first perforation 150A. As shown in FIG. 8, the first perforations 150A and the second perforations 150B have greater depths than the third and fourth perforations 150C, 150D because the scanning head 320 has not yet laser drilled into the third and fourth perforations 150C, 150D during the current cycle. The femtosecond laser 202 may be controlled to repeat the sequence multiple times (e.g., tens or hundreds or thousands of cycles) until the perforations 150 in the array have a designated size and shape. Although FIG. 8 shows an array of four perforations 150A-D, it is recognized that the scanning head 320 may be configured to laser drill arrays of thousands or even millions of perforations within a single sequence.

By gradually laser drilling all of the perforations 150 in an array utilizing multiple cycles or sweeps of the scanning head 320, there is a time interval defined between each cycle in which heat from each of the perforations 150 can dissipate. For example, after the laser beam 302 is removed from the second perforation 150B, heat can dissipate from the second perforation 150B during the time in which the femtosecond laser 202 emits the laser beam 302 at the third perforation 150C, then the fourth perforation 150D, and then the first perforation 150A again. In at least one embodiment, the combination of the large time interval 310 between successive pulses 214 and the time interval or lapse between successive cycles of the femtosecond laser 202 provides adequate time for heat dissipation to prevent damage due to thermal conduction.

Figure 9:
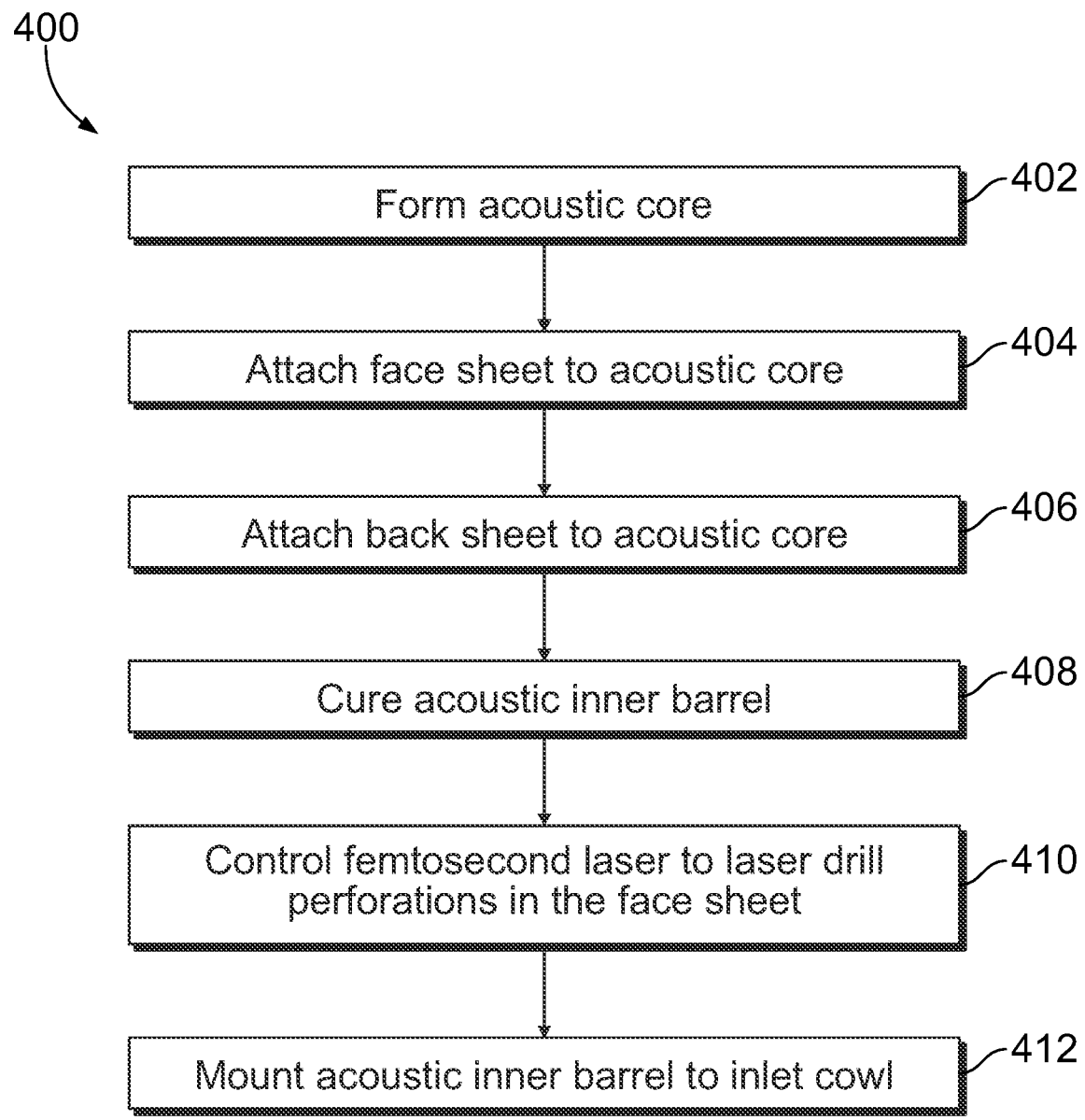
FIG. 9 is a flow chart of a method for forming an engine inlet assembly, according to an embodiment of the present disclosure.

FIG. 9 is a flow chart of a method 400 for forming an engine inlet assembly, according to an embodiment of the present disclosure. Referring to FIGS. 1-8, the method 400 begins at 402, at which an acoustic core 128 is formed. The acoustic core 128 is formed to include a honeycomb array of attached hexagonal cells 130. The acoustic core 128 may be formed via additive manufacturing, but in an alternative embodiment may be formed via another process, such as molding. The acoustic core 128 optionally may be formed in an annular barrel shape during the formation process, or alternatively may be formed in a planar or flat shape and subsequently bend or molded into a barrel shape. The formed acoustic core 128 includes an annular interior side 136 that defines a cavity 140.

At 404, a face sheet 134 is attached to the annular interior side 136 of the acoustic core 128 such that the face sheet 134 is exposed within the cavity 140 and defines a perimeter of the cavity 140. The face sheet 134 may be attached to the acoustic core 128 by bonding the face sheet 134 to the interior side 136 of the acoustic core 128. The face sheet 134 is a composite material that includes multiple layers or plies of fiber-reinforced polymer matrix material, such as carbon fibers (e.g., graphite) in epoxy. In at least one embodiment, the face sheet 134 is formed in-situ on the acoustic core 128. For example, multiple layers of the fiber-reinforced material may be deposited, one at a time, on the interior side 136 of the acoustic core 128 via an automated fiber placement (AFP) process. In at least one embodiment, the layers of the fiber-reinforced material may be deposited on the acoustic core 128 while the acoustic core 128 is in the barrel-shaped configuration. In an alternative embodiment, the layers are deposited while the acoustic core 128 is in a flat configuration, and the combination structure is bent or molded into the barrel shape after attaching the face sheet 134 to the acoustic core 128.

At 406, a back sheet 132 is attached to the acoustic core 128 along an exterior side of the acoustic core 128 that is opposite the face sheet 134 such that the acoustic core 128 is sandwiched between the face sheet 134 and the back sheet 132. The back sheet 132 may be attached to the acoustic core 128 in a similar process or a different process than how the face sheet 134 is attached to the acoustic core 128. For example, the back sheet 132 optionally may be formed in-situ on the acoustic core 128 via an AFP process or by laying up the back sheet 132 along the exterior side of the acoustic core 128 and then bonding and/or curing.

At 408, the combined structure including the acoustic core 128 between the face sheet 134 and the back sheet 132 is cured to form a unitary composite structure. The combined structure defines or represents an acoustic inner barrel 120. The acoustic inner barrel 120 may have the barrel shape prior to curing, such that the acoustic inner barrel 120 is cured in the barrel shape.

At 410, a femtosecond laser 202 is controlled to laser drill a plurality of perforations 150 in the face sheet 134 without burning portions of the face sheet 134 of the acoustic core 128 surrounding the perforations 150. The femtosecond laser 202 may be controlled automatically by a control unit 204 that includes one or more processors operating according to programmed instructions. The femtosecond laser 202 may be controlled to emit laser pulses 214 at a frequency of over 100,000 Hz. The femtosecond laser 202 may be controlled to emit laser pulses 214 at ultrashort pulse durations 308 between about 100 fs and about 10,000 fs. The diameters of the perforations 150 may be controlled to be between about 50 µm and about 500 µm.

In at least one embodiment, the femtosecond laser 202 is controlled to emit one or more laser pulses 214 at each of multiple perforation locations 322 along the face sheet 134 one at a time in a sequence. The femtosecond laser 202 is then controlled to repeat the sequence multiple times (e.g., for multiple cycles) in order to gradually form an array of the perforations 150 at the perforation locations 322.

In at least one embodiment, the laser drilling at step 410 occurs subsequent to the steps 402, 404, 406, and 408. For example, the acoustic inner barrel 120 is assembled and formed into the closed barrel shape prior to the femtosecond laser 202 laser drilling the perforations along the inner surface 218 of the face sheet 134. The femtosecond laser 202 may be controlled to extend at least partially into the cavity 140 of the acoustic inner barrel 120 to achieve a desired position and orientation for aiming the laser pulses 214 at the designated perforation locations 322.

At 412, the acoustic inner barrel 120 is mounted to an inner side 142 of an inlet cowl 114 of a gas turbine engine 108 to define an engine inlet assembly 122. The engine inlet assembly 122 is configured to guide air flow into the gas turbine engine 108. The acoustic inner barrel 120 is exposed to the air flow, and the perforations 150 absorb some of the noise that is generated by fan blades rotating at high speed, and thereby reduce the overall noise output of the gas turbine engine 108.

As described above, embodiments of the present disclosure provide systems and methods for forming perforations in an acoustic structure which may be performed in a timely, efficient, and cost-effective manner. Further, embodiments of the present disclosure provide systems and methods for accurately and precisely laser-forming perforations within an acoustic structure that does not burn or otherwise damage surrounding areas of the acoustic structure around the perforations due to little to no thermal conduction from the laser to the acoustic structure. Moreover, embodiments of the present disclosure provide systems and method of efficiently manufacturing acoustic structures by forming several components via additive manufacturing and/or in-situ methods to reduce the overall number of steps in the manufacturing process.

As described above, embodiments of the present disclosure provide systems and methods of forming an acoustic inner barrel of an engine of an aircraft. Embodiments of the present disclosure may be used with respect to various other components other than acoustic inner barrels. For example, embodiments of the present disclosure may be used with respect to various other acoustic treatments within propulsion systems, such as translating sleeves, inner walls, and the like. In short, embodiments of the present disclosure are not limited to acoustic inner barrels.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

The diagrams of embodiments herein may illustrate one or more control or processing units, such as the control unit 204 shown in FIG. 6. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 204 may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. The control unit 204 shown in FIG. 6 is configured to execute a set of instructions that are stored in one or more storage elements (such as one or more memories), in order to process data. For example, the control unit 204 may include or be coupled to one or more memories. The storage elements may also store data or other information as desired or needed. The storage elements may be in the form of an information source or a physical memory element within a processing machine.

The set of instructions may include various commands that instruct the control unit 204 (FIG. 6) as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A forming system comprising:
a femtosecond laser configured to emit laser pulses onto an inner surface of a face sheet of an acoustic inner barrel, the acoustic inner barrel including an acoustic core comprising an array of hexagonal cells attached to an outer surface of the face sheet that is opposite the inner surface; and
a control unit comprising one or more processors operatively connected to the femtosecond laser, the control unit configured to control the femtosecond laser to laser drill a plurality of perforations in the face sheet via emitting laser pulses at pulse durations between about 100 femtoseconds and about 10,000 femtoseconds and at frequencies over 100,000 Hz,
wherein the control unit is configured to control the femtosecond laser to emit the laser pulses at multiple perforation locations along the face sheet one at a time in a sequence such that a first set of one or more laser pulses is emitted at a first perforation location and then a second set of one or more laser pulses is emitted at a second perforation location, the control unit further configured to control the femtosecond laser to repeat the sequence multiple times to gradually form the perforations at the multiple perforation locations, and
wherein the control unit is further configured to control the femtosecond laser to repeat the sequence such that a third set of one or more laser pulses is emitted at the first perforation location subsequent to the second set being emitted at the second perforation location and before a fourth set of one or more laser pulses is emitted at the second perforation location.

2. The forming system of claim 1, wherein the control unit is configured to control the femtosecond laser to laser drill the perforations through a thickness of the face sheet to an interface between the face sheet and the acoustic core without penetrating the acoustic core.

3. The forming system of claim 1, wherein the femtosecond laser includes a scanning head, and the control unit is configured to control the scanning head to emit one or more laser pulses at each of multiple perforation locations along the face sheet one at a time in a sequence, and to repeat the sequence multiple times to gradually form the perforations at the perforation locations.

4. The forming system of claim 1, wherein the femtosecond laser extends at least partially into a cavity defined by the acoustic inner barrel to laser drill the perforations in the face sheet.

5. The forming system of claim 1, wherein the control unit is configured to control the femtosecond laser to laser drill the perforations in the face sheet in a designated pattern with a predetermined percent-open-area.

6. The forming system of claim 1, wherein the control unit is configured to control the femtosecond laser to laser drill the perforations in the face sheet to have diameters between about 50 micrometers and about 500 micrometers.

7. The forming system of claim 1, wherein the acoustic inner barrel has an annular barrel shape, and the forming system further comprises a positioning platform that supports the acoustic inner barrel, the positioning platform including rollers that rotate the acoustic inner barrel relative to the femtosecond laser.

8. The forming system of claim 7, wherein the acoustic inner barrel is held in a vertical orientation by the positioning platform such that a centerline axis of the acoustic inner barrel is parallel to a horizontal plane of the positioning platform.

9. A forming system comprising:
a positioning platform configured to hold an acoustic inner barrel that has an annular barrel shape that defines a cavity, the acoustic inner barrel including a face sheet and an acoustic core;
a femtosecond laser held by an effector arm, the effector arm configured to position the femtosecond laser at least partially into the cavity of the acoustic inner barrel that is held by the positioning platform; and
a control unit comprising one or more processors operatively connected to the femtosecond laser, the control unit configured to control the femtosecond laser to emit laser pulses onto an inner surface of the face sheet to laser drill perforations in the face sheet,
wherein the positioning platform is configured to rotate the acoustic inner barrel about a centerline axis of the acoustic inner barrel, relative to the femtosecond laser,
wherein the control unit is configured to control the femtosecond laser to emit the laser pulses at multiple perforation locations along the face sheet one at a time in a sequence such that a first set of one or more laser pulses is emitted at a first perforation location and then a second set of one or more laser pulses is emitted at a second perforation location, the control unit further configured to control the femtosecond laser to repeat the sequence multiple times to gradually form the perforations at the multiple perforation locations, and
wherein the control unit is further configured to control the femtosecond laser to repeat the sequence such that a third set of one or more laser pulses is emitted at the first perforation location subsequent to the second set being emitted at the second perforation location and before a fourth set of one or more laser pulses is emitted at the second perforation location.

10. The forming system of claim 9, wherein the control unit is configured to control the femtosecond laser to emit the laser pulses at pulse durations between about 100 femtoseconds and about 10,000 femtoseconds and at frequencies over 100,000 Hz such that the perforations are formed in the face sheet without burning portions of the face sheet surrounding the perforations.

11. The forming system of claim 9, wherein the acoustic core comprises an array of hexagonal cells attached to an outer surface of the face sheet that is opposite the inner surface, and the positioning platform includes rollers configured to engage the outer surface of the face sheet to rotate the acoustic inner barrel about the centerline axis.

12. The forming system of claim 9, wherein the positioning platform is configured to hold the acoustic inner barrel in a vertical orientation such that the centerline axis of the acoustic inner barrel is parallel to a horizontal plane of the positioning platform.

13. The forming system of claim 9, wherein the control unit is configured to control the femtosecond laser to emit the laser pulses at multiple perforation locations along the face sheet one at a time in a sequence such that a first set of one or more laser pulses is emitted at a first perforation location and then a second set of one or more laser pulses is emitted at a second perforation location, the control unit further configured to control the femtosecond laser to repeat the sequence multiple times to gradually form the perforations at the multiple perforation locations.

14. The forming system of claim 9, wherein the control unit is configured to control the femtosecond laser to laser drill the perforations in the face sheet to have diameters between about 50 micrometers and about 500 micrometers.

15. A forming system comprising:
a femtosecond laser configured to emit laser pulses onto an inner surface of a face sheet of an acoustic inner barrel, the acoustic inner barrel including an acoustic core; and
a control unit comprising one or more processors operatively connected to the femtosecond laser, the control unit configured to control the femtosecond laser to emit laser pulses at multiple perforation locations along the inner surface one at a time in a sequence, wherein a first set of the laser pulses is emitted by the femtosecond laser at a first perforation location and then a second set of the laser pulses is emitted at a second perforation location, the control unit further configured to control the femtosecond laser to repeat the sequence multiple times to gradually form perforations in the face sheet at the multiple perforation locations, and
wherein the control unit further is configured to control the femtosecond laser to repeat the sequence such that a third set of one or more laser pulses is emitted at the first perforation location subsequent to the second set being emitted at the second perforation location and before a fourth set of one or more laser pulses is emitted at the second perforation location.

16. The forming system of claim 15, wherein the control unit is configured to control the femtosecond laser to emit the laser pulses at frequencies over 100,000 Hz.

17. The forming system of claim 15, further comprising an effector arm mounted to the femtosecond laser, the effector arm holds the femtosecond laser within a cavity defined by the acoustic inner barrel to emit the laser pulses.

18. The forming system of claim 15, further comprising a positioning platform configured to hold the acoustic inner barrel, the positioning platform configured to rotate the acoustic inner barrel about a centerline axis of the acoustic inner barrel, relative to the femtosecond laser.

19. A forming system comprising:
a femtosecond laser configured to emit laser pulses onto an inner surface of a face sheet; and
a control unit comprising one or more processors operatively connected to the femtosecond laser,
wherein the control unit is configured to control the femtosecond laser to emit laser pulses at multiple perforation locations along the face sheet one at a time in a sequence such that a first set of one or more laser pulses is emitted at a first perforation location and then a second set of one or more laser pulses is emitted at a second perforation location, the control unit further configured to control the femtosecond laser to repeat the sequence multiple times to gradually form the perforations at the multiple perforation locations, and wherein the control unit is further configured to control the femtosecond laser to repeat the sequence such that a third set of one or more laser pulses is emitted at the first perforation location subsequent to the second set being emitted at the second perforation location and before a fourth set of one or more laser pulses is emitted at the second perforation location.

20. The forming system of claim 15, wherein the control unit is configured to control the femtosecond laser to laser drill through the face sheet without penetrating the acoustic core.

* * * * *